US011620580B2

(12) United States Patent
Mahna et al.

(10) Patent No.: US 11,620,580 B2
(45) Date of Patent: Apr. 4, 2023

(54) METHODS AND SYSTEMS FOR PROBABILISTIC FILTERING OF CANDIDATE INTERVENTION REPRESENTATIONS

(71) Applicant: Banjo Health Inc., Northborough, MA (US)

(72) Inventors: Saaransh Mahna, Northborough, MA (US); James Rollins, Fredericksburg, VA (US); Farzana Rahman, Milton, NH (US); Yuan Yu, Worcester, MA (US)

(73) Assignee: Banjo Health Inc., Boston, MA (US)

( * ) Notice: Subject to any disclaimer, the term of this patent is extended or adjusted under 35 U.S.C. 154(b) by 60 days.

(21) Appl. No.: 17/219,973

(22) Filed: Apr. 1, 2021

(65) Prior Publication Data

US 2022/0318600 A1 Oct. 6, 2022

(51) Int. Cl.
*G06N 20/00* (2019.01)
*G06N 3/04* (2023.01)
*G06N 3/08* (2023.01)
*G06N 7/00* (2023.01)
*G06N 7/02* (2006.01)

(52) U.S. Cl.
CPC ........... *G06N 20/00* (2019.01); *G06N 3/0472* (2013.01); *G06N 3/08* (2013.01); *G06N 7/005* (2013.01); *G06N 7/02* (2013.01); *G06N 3/0436* (2013.01)

(58) Field of Classification Search
None
See application file for complete search history.

(56) References Cited

U.S. PATENT DOCUMENTS

| | | | |
|---|---|---|---|
| 9,773,094 B1* | 9/2017 | Balagere | G16H 50/50 |
| 10,296,715 B1* | 5/2019 | Smith | G06Q 10/10 |
| 10,672,516 B1* | 6/2020 | McNair | G16H 50/20 |
| 10,896,405 B1* | 1/2021 | Hooker | G06N 5/003 |
| 11,056,222 B1* | 7/2021 | Nambirajan | G16H 20/10 |
| 11,191,466 B1* | 12/2021 | Heneghan | A61B 5/162 |
| 2007/0174252 A1* | 7/2007 | Rawlings | G06Q 40/08 |

(Continued)

OTHER PUBLICATIONS

Kang, Y. (2014). "Information And Decision-making In Health Care: Modeling And Analysis". Dissertation. The Pennsylvania State University. (Year: 2014).*

(Continued)

*Primary Examiner* — Lut Wong
(74) *Attorney, Agent, or Firm* — Caldwell Intellectual Property Law

(57) ABSTRACT

Embodiments relate to systems and methods for probabilistically filtering candidate intervention representations. Systems and methods are described that receive a candidate intervention representation; specify a plurality of parameters as a function of the candidate intervention representation; identify a plurality of analytical constraints, where each analytical constraint corresponds to an analytical parameter of the plurality of parameters; generate a probabilistic output as a function of the candidate intervention representation, the plurality of analytic constraints, and training data correlating past intervention representations to a deterministic outcome; and, filter the at least a candidate intervention representation using the probabilistic output.

20 Claims, 11 Drawing Sheets

(56) References Cited

U.S. PATENT DOCUMENTS

| | | | |
|---|---|---|---|
| 2008/0147440 A1* | 6/2008 | Kil | G16H 50/30 705/2 |
| 2008/0147441 A1* | 6/2008 | Kil | G16H 50/30 705/2 |
| 2008/0201172 A1 | 8/2008 | McNamar | |
| 2009/0172818 A1* | 7/2009 | Sutherland | G06F 21/577 726/25 |
| 2010/0063365 A1* | 3/2010 | Pisani | A61B 5/486 600/301 |
| 2011/0257992 A1* | 10/2011 | Scantland | G06Q 10/10 705/2 |
| 2013/0124127 A1* | 5/2013 | Ahuja | G01R 35/00 702/86 |
| 2014/0081652 A1* | 3/2014 | Klindworth | G16H 40/20 705/2 |
| 2015/0046173 A1* | 2/2015 | Furletti | G16H 10/60 705/2 |
| 2015/0134345 A1 | 5/2015 | Hyde | |
| 2015/0161413 A1* | 6/2015 | Calem | H04L 63/0428 705/51 |
| 2015/0228030 A1* | 8/2015 | Scantland | G16H 20/10 705/4 |
| 2016/0171177 A1* | 6/2016 | Caffarel | G06Q 40/08 705/3 |
| 2016/0180036 A1* | 6/2016 | Scantland | G06Q 10/10 705/2 |
| 2016/0241834 A1* | 8/2016 | Muninder | H04N 13/144 |
| 2017/0043180 A1* | 2/2017 | Amthor | A61N 5/1027 |
| 2018/0082032 A1 | 3/2018 | Allen | |
| 2018/0196435 A1* | 7/2018 | Kunzi | G08G 5/045 |
| 2018/0294048 A1* | 10/2018 | Blumenthal | G06Q 10/1095 |
| 2019/0352403 A1* | 11/2019 | Schwab | C07K 16/2827 |
| 2019/0392950 A1 | 12/2019 | Conroy | |
| 2020/0058381 A1 | 2/2020 | Patel | |
| 2020/0082933 A1* | 3/2020 | Lu | G16H 10/60 |
| 2020/0143946 A1* | 5/2020 | Lewis | G16H 10/60 |
| 2020/0314101 A1* | 10/2020 | Zhang | H04L 63/1433 |
| 2020/0355552 A1* | 11/2020 | Kreitinger | G01M 3/38 |
| 2020/0357001 A1* | 11/2020 | Lopez Garcia | G06Q 30/018 |
| 2020/0364404 A1 | 11/2020 | Priestas | |
| 2020/0388360 A1* | 12/2020 | Caffarel | G16H 10/60 |
| 2020/0394541 A1 | 12/2020 | Hazard | |
| 2020/0395103 A1 | 12/2020 | Ramakrishnan | |
| 2020/0410601 A1* | 12/2020 | Laumeyer | G06N 3/0436 |
| 2021/0121236 A1* | 4/2021 | Varkuti | A61B 17/3403 |
| 2021/0125179 A1* | 4/2021 | Mach | G06N 20/00 |

OTHER PUBLICATIONS

Lee, E.K.. et al. (2014). Medical alert management: a real-time adaptive decision support tool to reduce alert fatigue. In AMIA Annual Symposium Proceedings (vol. 2014, p. 845). American Medical Informatics Association. (Year: 2014).*

Retrieved from: https://nam.edu/wp-content/uploads/2019/12/AI-in-Health-Care-PREPUB-FINAL.pdf Title: Artificial Intelligence in Health Care Date: Michael Matheny By: Nov. 20, 2020.

\* cited by examiner

METHODS AND SYSTEMS FOR PROBABILISTIC FILTERING OF CANDIDATE INTERVENTION REPRESENTATIONS

FIELD OF THE INVENTION

The present invention generally relates to the field of artificial intelligence simulation and modeling. In particular, the present invention is directed to probabilistic filtering of candidate intervention representations based upon specific analytical constraints.

BACKGROUND

In some situations, potential interventions must be filtered prior to deployment. Filtering is often performed manually and may result in undesirable delays before deployment of the intervention. Additionally, filtering of potential interventions abounds with complexity, misidentification, and, as a result, error. Slow and error-laden filtering of potential interventions produce waste and inefficiencies within numerous industries, the world around.

SUMMARY OF THE DISCLOSURE

In an aspect, a method of probabilistically filtering candidate intervention representations includes receiving, using a processor, at least a candidate intervention representation; specifying, using the processor, a plurality of parameters as a function of the at least a candidate intervention representation; identifying, using the processor, a plurality of analytical constraints, where each analytical constraint corresponds to an analytical parameter of the plurality of parameters; generating, using the processor, a probabilistic output as a function of the at least a candidate intervention representation, the plurality of analytic constraints, and training data correlating past intervention representations to a deterministic outcome; and, filtering, using the processor, the at least a candidate intervention representation using the probabilistic output.

In another aspect a system for probabilistically filtering candidate intervention representations includes a processor configured to: receive at least a candidate intervention representation; specify a plurality of parameters as a function of the at least a candidate intervention representation; identify a plurality of analytical constraints, where each analytical constraint corresponds to an analytical parameter of the plurality of parameters; generate a probabilistic output as a function of the at least a candidate intervention representation, the plurality of analytic constraints, and training data correlating past intervention representations to a deterministic outcome; and, filter, using the processor, the at least a candidate intervention representation using the probabilistic output.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods to filter potential intervention representations not only by using predetermined functions, but also by probabilistically filtering potential interventions, based upon deterministic information that correlates deterministic intervention representations with their deterministic classifications. In an embodiment, machine-learning and/or artificial intelligence techniques may be used to derive a function or set of functions that correlate intervention representations with their determined classifications; and these functions may then be used for probabilistic filtering.

In some situations, potential interventions must be filtered prior to deployment. For example, a potential intervention, in some, may need to be approved by an authority prior to deployment. Conventionally, filtering may include trying to match a set of criteria governing the filtering process, with an individual intervention prior to deployment. Continuing with the example, circumstances surrounding a particular potential intervention may need to be reconciled with a set of rules determining approval criteria for an intervention. If the filtering process gates deployment of an intervention, as is the case with an approval filter, deployment of an intervention is delayed.

Aspects of the present disclosure allow for fast automatic filtering of potential interventions to minimize time before deployment and inconsistent performance. Exemplary embodiments illustrating aspects of the present disclosure are described below in the context of several specific examples.

Figure 1:
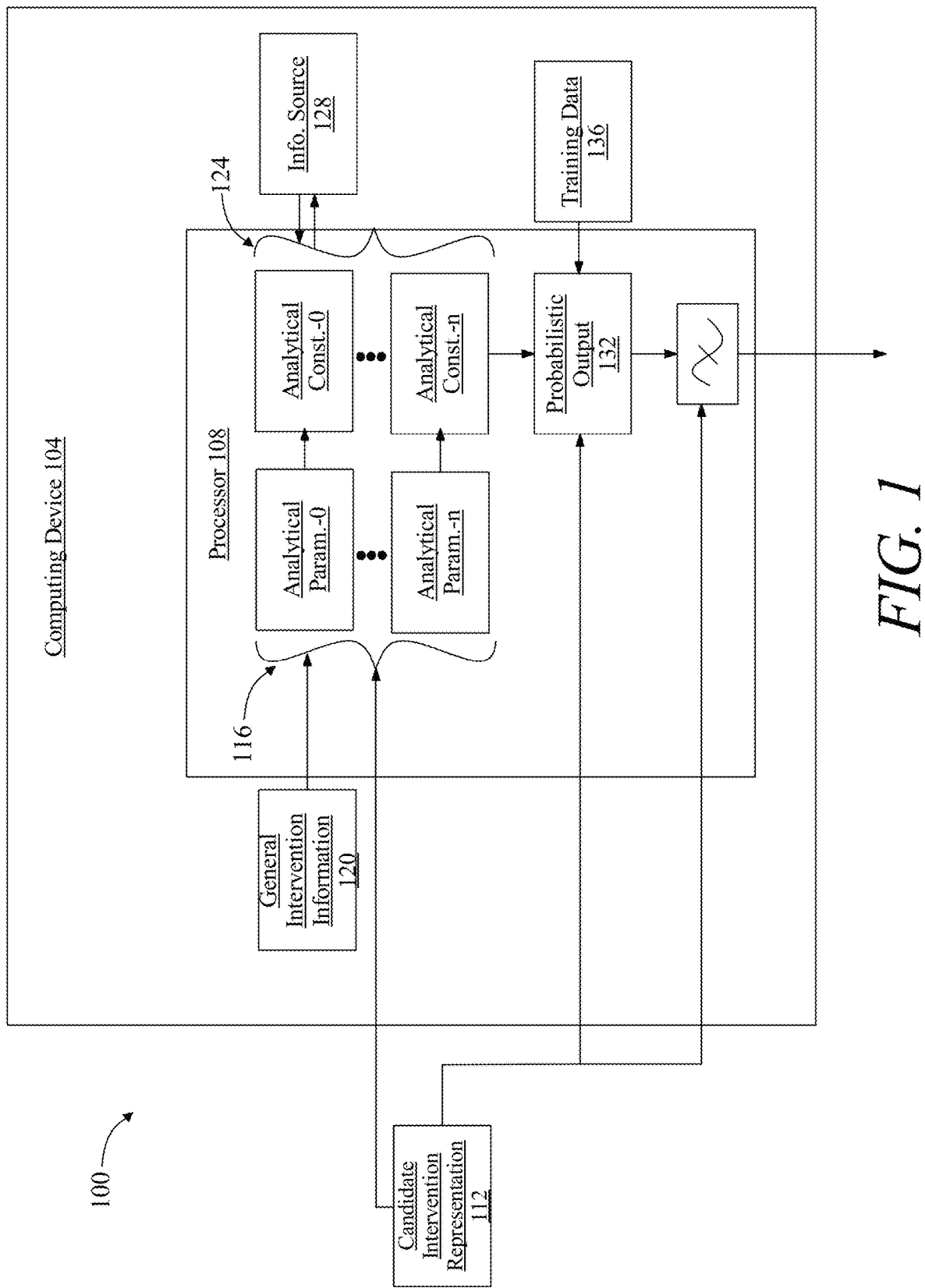
FIG. 1 is a block diagram of an exemplary embodiment of a system for probabilistically filtering candidate intervention representations.

Referring now to FIG. 1, an exemplary embodiment of a system 100 for probabilistically filtering candidate intervention representations is illustrated. System includes a computing device 104. Computing device 104 may comprise a processor 108 configured to execute instructions, for example a series of steps. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 104 may include a single computing device operating independently, or may include two or more computing device operating in concert, in parallel, sequentially or the like; two or more computing devices may be included together in a single computing device or in two or more computing devices. computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device 104.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 is configured to receive at least a candidate intervention representation 112. As used in this disclosure a "candidate intervention representation" is a representation of a potential intervention, which must be classified according to a finite number of predetermined classes. In some embodiments, predetermined classes may be binary, for example ON/OFF, 1/0, True/False, Black/White, Accepted/Denied, or the like. Candidate intervention representation 112, in some embodiments, may include, directly or by way of reference, intervention information. Intervention information may cover aspects of potential intervention represented by candidate intervention representation 112. In some embodiments, candidate intervention representation 112 may be received by one or more of fax or networked electronic communication. A plurality of parameters 112 may be specified as a function of a candidate intervention representation 112. Commonly, analytical parameters may be related to a potential intervention. In some embodiments, plurality of parameters 112 may be specified according to intervention information specific to a candidate intervention representation 112 and general intervention information 120. General intervention information 120 may be stored locally on computing device 104, or the general intervention information 120 may be stored remotely and accessed by the computing device, for example by way of one or more networks. One or more analytical specification algorithms may be employed to determine plurality of parameters 112 resulting from a candidate intervention representation 112. Exemplary embodiments of analytical parameters specification algorithms include decision trees, a supervised machine-learning algorithm, a random forest X-tree boost, one or more neural networks. In some exemplary embodiments, specification of analytical parameters 112 includes determination of one or more criteria based upon a candidate intervention representation. For example, if a determination of a first criterion is made based upon a candidate intervention representation 112 a first plurality of parameters 112 are specified. Continuing with the example, if a determination of a second criterion is made based upon a candidate intervention representation 112 a second plurality of parameters 112 are specified. In this example, some analytical parameters may, in some cases, be members of both first plurality of parameters and second plurality of parameters. In some embodiments, one or more mappings, between a criterion and a plurality of analytic parameters are included within general intervention information 120.

Continuing in reference to FIG. 1, plurality of analytical constraints 124 may be identified by computing device 104. Each analytical constraint of plurality of analytical constraints 124 corresponds to an analytical parameter of plurality of parameters 116. In some embodiments, analytical constraints are identified from candidate intervention representation 112. Exemplary methods of identification of analytical constraints include natural language processing, or the like. In some embodiments, at least a portion of a plurality of analytical constraints may be identified by way of interrogating an information source 128. Exemplary information sources 128 include, without limitation, a user device, a database, a remote memory, or a local memory. In some embodiments, each analytical parameter of a plurality of parameters must be associated (e.g., mapped) with an analytical constraint. Analytical constraints, in some cases, may be continuous values or categorical values. In some embodiments, computing device 104 may be further configured to interrogate a user device for plurality of analytical constraints 124. In some cases, user device may be local to computing device 104. Alternatively or additionally, user device may be remote to computing device and is communicative with the computing device 104 by way of one or more networks. In an exemplary case, computing device 104 may interrogate a user device by way of one or more forms. One or more forms provide for direct entry of each analytical constraint. One or more forms may be submitted to computing device 104 with each analytical constraint by a user, or another resource.

Still referring to FIG. 1, computing device 104 may perform one or more steps of interrogating user device, identifying analytical constraints, and/or identification of parameters as described above using a language processing modules and/or processes. Natural language processing may include any methods and/or processes for natural language processing described in this disclosure. Alternatively or additionally, in some embodiments, computing device 104 may interface conversationally with user by using a language processing module. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Further referring to FIG. 1, language processing module may operate to produce a language processing model. Language processing model may include a program automatically generated by computing device 104 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device 104, or the like.

Still referring to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Further referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or computing device 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into computing device 104. Documents may be entered into a computing device 104 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

In an embodiment, and still referring to FIG. 1, natural language processing may be used to convert one or more textual inputs to canonical forms. A "canonical form" as used in this description is a particular string used as an input to a machine-learning model, process, or the like, and/or as a query element and/or indexed element in a database. Computing device 104 may utilize natural language processing to convert a given element of text extracted from a document, received from a user device, or the like to a canonical form by identifying a synonymous and/or closely related phrase using a language processing model such as without limitation a vector space; for instance, computing device 104 may identify a canonical phrase and/or word corresponding to a vector that is highly geometrically similar to the given element of text, for instance and without limitation as a function of cosine similarity.

With further reference to FIG. 1, computing device 104 may use language processing to rearrange wording of outputs, where outputs include without limitation any part of any document and/or other textual data and/or data structure containing textual data to be output to a user, transmitted to a device other than computing device 104, or the like. For instance, and without limitation, outputs may be initially generated by machine-learning processes and/or database queries, converted to an alternative form having a synonymous and/or related meaning to initial output, and output in converted form. Converted form may include a form having and/or belonging to a particular category and/or characteristic; computing device 104 may determine whether an initial form has and/or belongs to the particular category and/or characteristic, and may convert to converted form if not. For instance, converted form may be phrased as a question; computing device may determine that initial form is not a question and may convert initial form to a converted form phrased as a question. This may be performed by identifying one or more potential converted forms having and/or belonging to particular category and/or characteristic that are also closely related to initial form.

With continued reference to FIG. 1, processor is configured to generate a probabilistic output 132. Probabilistic output 132 is generated as a function of a candidate intervention representation 112, a plurality of analytic constraints 124, and training data 136. In some embodiments, training data may correlate past intervention representations to deterministic outcomes. Training data may be implemented in any manner described below. In some embodiments, training data 136 may be included within a function to generate a probabilistic output 132. For example, in some embodiments without limitation, a function to generate a probabilistic output 132 may include a decision tree and training data 136 has been codified within the decision tree. In some embodiments, a function to generate a probabilistic output 132 may include use of a machine-learning model that has been trained using training data 136. As used in this disclosure "probabilistic output" is an output having a probability component. For example, a probabilistic output 132 may be a classification with a confidence of classification expressed as a probability (e.g., approved, P=0.75).

With continued reference to FIG. 1, a candidate intervention representation 112 may be filtered using probabilistic output 132. In some embodiments, filtering a candidate intervention representation 112 comprises classifying the candidate intervention representation 112 according to a finite number of predetermined classes. In some embodiments, predetermined classes may be binary, for example ON/OFF, 1/0, True/False, Black/White, or Accepted/Denied. In some cases, computing device 104 may be further configured to filter a candidate intervention representation 112 to result in an output classifying a status, wherein the status is either approved of denied. Filtering may be performed using, without limitation, using a classifier, such as without limitation a linear classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, in some embodiments, system 100 may include a storage component configured to securely store a candidate intervention representation. As used in this disclosure "securely store" refers to methods employed to prevent unintended access (i.e., reading, writing, or executing) of information. For example, a candidate intervention representation may be encrypted and stored to memory, in some embodiments. Alternatively, in another example, a candidate intervention representation 112 may be securely stored, as it is being communicated to computing device 104. In some embodiments, candidate intervention representation 112 may be communicated to and/or from computing device 104 in an obfuscated form (e.g., encrypted), such that substantially only the computing device 104 may reliably access the candidate intervention representation 112. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used in this disclosure, as well as categories and/or populations of data consistently with this disclosure.

In an embodiment, and continuing to refer to FIG. 1, methods and systems described in this disclosure may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Still referring to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where $A+B=-R$, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, and with further reference to FIG. 1, systems and methods described in this disclosure produce cryptographic hashes, also referred to by the equivalent shorthand term "hashes." A cryptographic hash, as used in this disclosure, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, and still referring to FIG. 1, a hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described in this disclosure. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")—family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the GrØstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Further referring to FIG. 1, a "digital signature," as used in this disclosure, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, and still referring to FIG. 1, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, and still referring to FIG. 1, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 1, in some embodiments, computing device 104 may be configured to generate a probabilistic output 132 by operating a machine-learning model, which has been trained using training data 136. For example, computing device 104, in some cases, may train a machine-learning model using training data 136. In some exemplary embodiments, machine-learning model is trained using a supervised machine learning algorithm. Unsupervised machine learning algorithms are described in detail below. In some other exemplary embodiments, machine-learning model is trained using a supervised machine learning algorithm. Supervised machine learning algorithms are described in detail below. In some embodiments, a machine-learning model may comprise or have been trained using a neural network.

Figure 2:
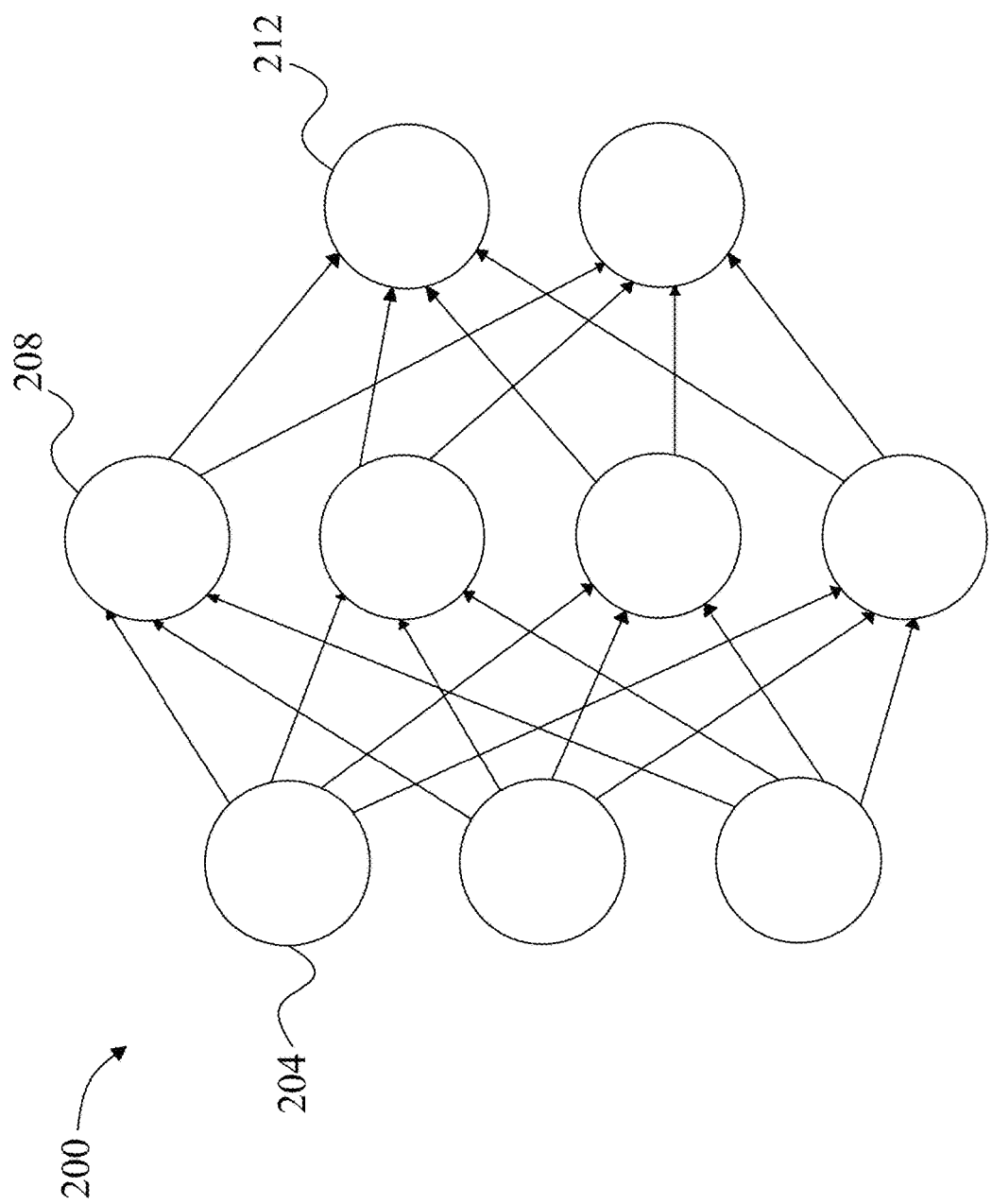
FIG. 2 is a schematic diagram of an exemplary embodiment of a neural network.

Referring now to FIG. 2 an exemplary embodiment of neural network 200 is illustrated. Neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 204, one or more intermediate layers 208, and an output layer of nodes 212. Connections between nodes may be created via the process of "training" the network, in which elements from a training dataset are applied to input nodes 204, a suitable training algorithm (such as Levenberg-Marquardt, conjugate gradient, simulated annealing, or other algorithms) is then used to adjust the connections and weights between nodes in adjacent layers 208 of the neural network to produce the desired values at output nodes 212. This process is sometimes referred to as deep learning.

Figure 3:
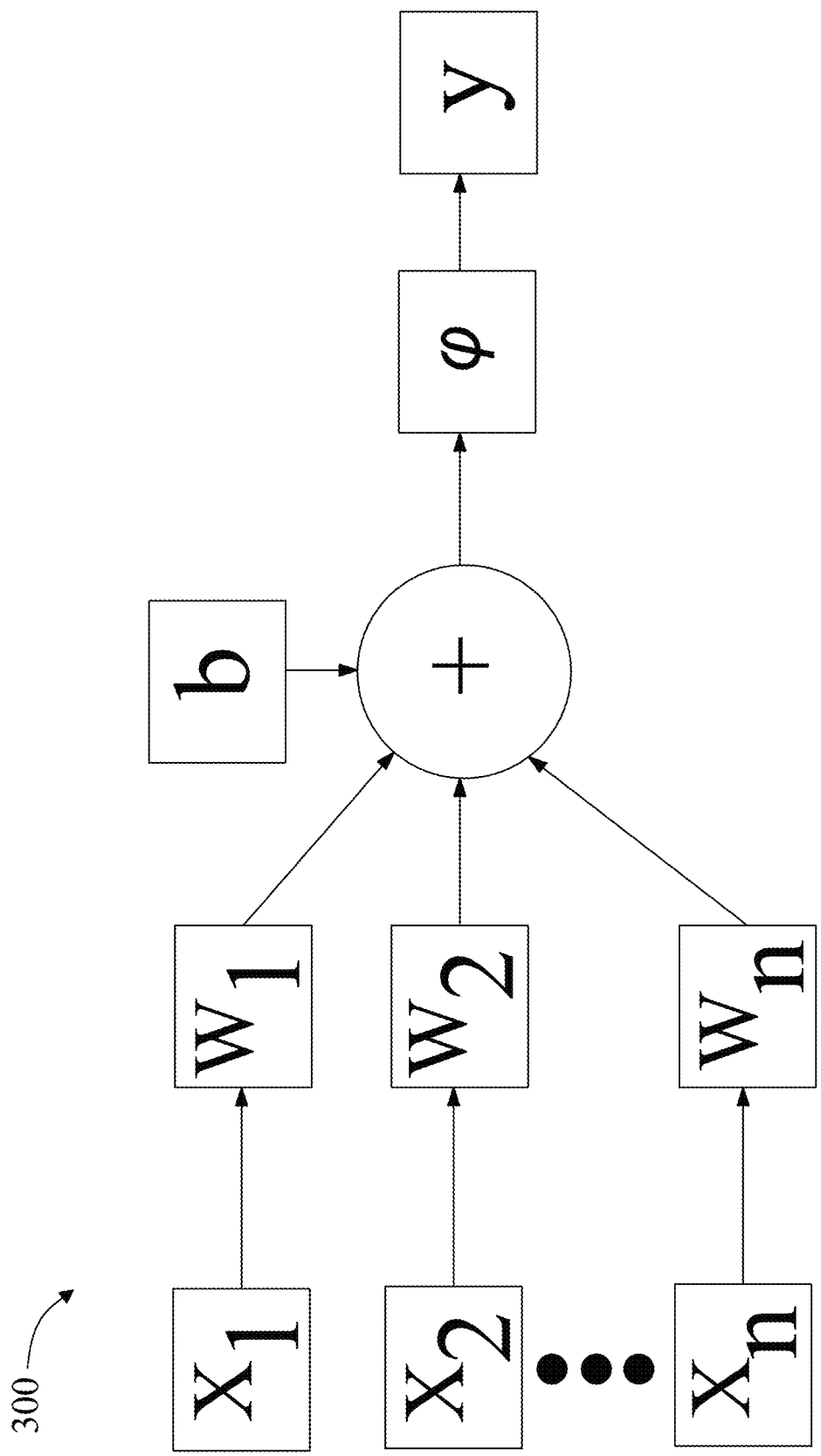
FIG. 3 is a schematic diagram of an exemplary embodiment of a node of a neural network.

Referring now to FIG. 3, an exemplary embodiment of a node 300 of a neural network is illustrated. A node 300 may include, without limitation a plurality of inputs $x_i$ that may receive numerical values from inputs to a neural network containing the node and/or from other nodes. Node 300 may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Still referring to FIG. 3, a neural network may receive candidate intervention representations as inputs and output a probabilistic output 132 representing a probability of classification to a predetermined class according to weights $w_i$ that are derived using machine-learning processes as described in this disclosure.

Referring again to FIG. 1, In some embodiments, computing device 104 may be configured to modify training data 136 in response to a probabilistic output 132 correlated to a deterministic intervention representation; where the deterministic intervention representation may represent an actual known occurrence that is related to a candidate intervention representation 112. For example, computing device 104 may, in some cases, retrain a machine-learning model using a probabilistic output 132 correlated to a deterministic intervention representation. In some embodiments, the computing device 104 may be configured to filter a candidate intervention representation 112 and determine a confidence output. As used in this disclosure "confidence output" is a quantitative representation of filtering performance. For example, in some exemplary embodiments confidence output may be a floating point number within a prescribed range, such as without limitation 0 to 1, with each end of the prescribed range representing an extreme representation, such as without limitation substantially no confidence and substantially absolute confidence, respectively. In some cases, confidence output may represent a relationship between a result of filtering and probabilistic output 132. Confidence output may be determined one more comparisons algorithms, such as without limitation a fuzzy set comparison. For example, in some exemplary embodiments a fuzzy set comparison may be employed to compare probabilistic outcome with a membership function derived to represent at least a threshold used for classification.

Figure 4:
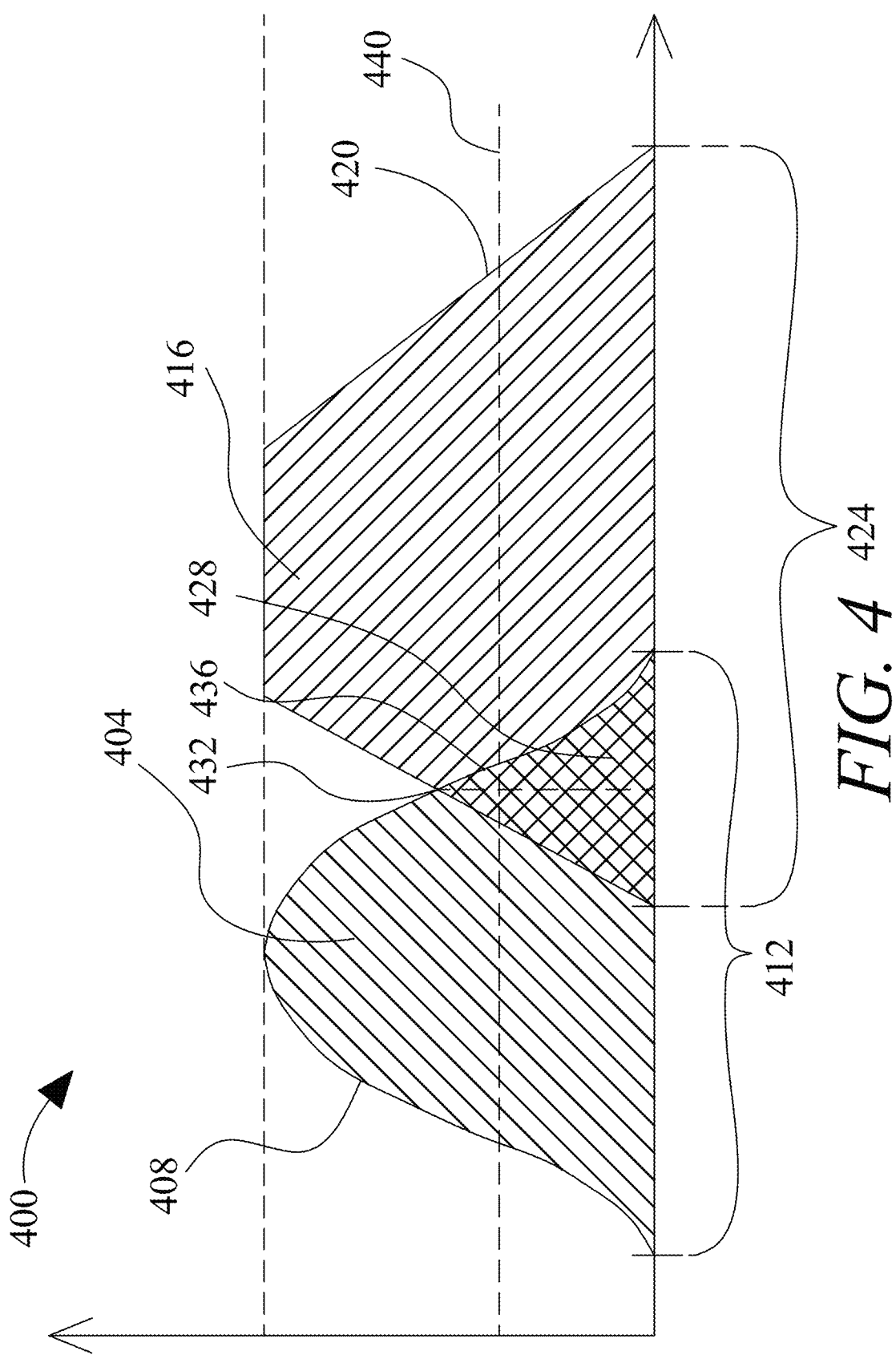
FIG. 4 is a graph representing an exemplary embodiment of a fuzzy set comparison.

Referring to FIG. 4, an exemplary embodiment of fuzzy set comparison 400 is illustrated. A first fuzzy set 404 may be represented, without limitation, according to a first membership function 408 representing a probability that an input falling on a first range of values 412 is a member of the first fuzzy set 404, where the first membership function 408 has values on a range of probabilities such as without limitation the interval [0,1], and an area beneath the first membership function 408 may represent a set of values within first fuzzy set 404. Although first range of values 412 is illustrated for clarity in this exemplary depiction as a range on a single number line or axis, first range of values 412 may be defined on two or more dimensions, representing, for instance, a Cartesian product between a plurality of ranges, curves, axes, spaces, dimensions, or the like. First membership function 408 may include any suitable function mapping first range 412 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 4, first fuzzy set 404 may represent any value or combination of values as described above, including probabilistic output 132, a predetermined class, such as without limitation an approved class or a denied class, and/or any combination of the above. A second fuzzy set 416, which may represent any value which may be represented by first fuzzy set 404, may be defined by a second membership function 420 on a second range 424; second range 424 may be identical and/or overlap with first range 412 and/or may be combined with first range via Cartesian product or the like to generate a mapping permitting evaluation overlap of first fuzzy set 404 and second fuzzy set 416. Where first fuzzy set 404 and second fuzzy set 416 have a region 428 that overlaps, first membership function 208 and second membership function 420 may intersect at a point 432 representing a probability, as defined on probability interval, of a match between first fuzzy set 404 and second fuzzy set 416. Alternatively or additionally, a single value of first and/or second fuzzy set may be located at a locus 436 on first range 412 and/or second range 424, where a probability of membership may be taken by evaluation of first membership function 408 and/or second membership function 420 at that range point. A probability at 428 and/or 432 may be compared to a threshold 440 to determine whether a positive match is indicated. Threshold 440 may, in a non-limiting example, represent a degree of match between first fuzzy set 404 and second fuzzy set 416, and/or single values therein with each other or with either set, which is sufficient for purposes of the matching process; for instance, threshold may indicate a sufficient degree of overlap between a probabilistic output 132 and a predetermined class for combination to occur as described above. Alternatively or additionally, each threshold may be tuned by a machine-learning and/or statistical process, for instance and without limitation as described in further detail below.

Further referring to FIG. 4, in an embodiment, a degree of match between fuzzy sets may be used to classify a probabilistic output 132 relating to a candidate intervention representation 112 with a predetermined class. For instance, if a probabilistic output 132 of a candidate intervention representation has a fuzzy set matching a predetermined class fuzzy set by having a degree of overlap exceeding a threshold, computing device 104 may classify the candidate intervention representation as belonging to the predetermined class. Where multiple fuzzy matches are performed, degrees of match for each respective fuzzy set may be computed and aggregated through, for instance, addition, averaging, or the like, to determine an overall degree of match.

Still referring to FIG. 4, in an embodiment, a probabilistic output 132 of a candidate intervention representation 112 may be compared to multiple predetermined fuzzy sets. For instance, probabilistic output 132 may be represented by a fuzzy set that is compared to each of the multiple predetermined class fuzzy sets; and, a degree of overlap exceeding a threshold between the probabilistic output fuzzy set and any of the multiple predetermined class fuzzy sets may cause computing device 104 to classify the candidate intervention representation as belonging to a predetermined class. For instance, in one embodiment there may be two predetermined class fuzzy sets, representing respectively an approved class and a denied class. Approved class may have an approved class fuzzy set; denied class may have a denied class fuzzy set; and probabilistic output 104 may have a probabilistic output fuzzy set. Computing device 104, for example, may compare a probabilistic output fuzzy set with each of approved class fuzzy set and denied class fuzzy set, as described above, and classify a candidate intervention representation to either, both, or neither of approved class or denied class. Machine-learning methods as described below may, in a non-limiting example, generate coefficients used in fuzzy set equations as described above, such as without limitation x, c, and σ of a Gaussian set as described above, as outputs of machine-learning methods.

Figure 5:
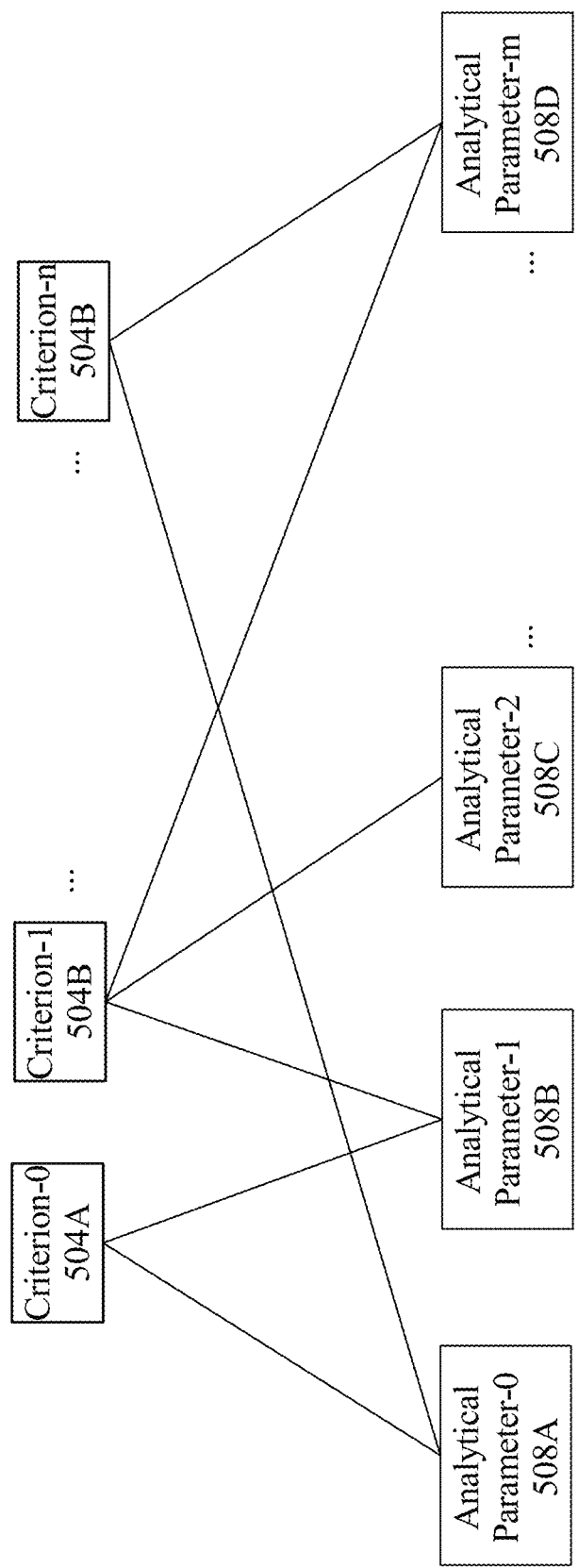
FIG. 5 illustrates an exemplary embodiment of mapping between criteria and analytic parameters.

Referring to FIG. 5, an exemplary mapping 500 is shown, that illustrates associations between a number of criteria 504A-C and a number of analytical parameters 508A-D. As described in detail above, specification of a plurality of parameters 116 may be achieved by first determining presence of one or more criteria, where each of the one or more criteria are mapped to one or more analytical parameters. In this case, specifying a plurality of parameters may include two steps (1) determining a presence of one or more criteria, and (2) specifying analytical parameters associated with present criteria. Mapping 500 of criteria and analytical parameters may be stored directly upon computing device 104 or remotely. In some embodiments, criteria 504A-C and/or analytical parameters 508A-D may be added or removed from mapping 500, to update, retrain, maintain, or improve system 100 performance. It can be seen that exemplary mapping 500 allows analytical parameters to be associated with more than one criteria. For example, Analytical Parameter-0 508A is shown associated with Criterion-0 504A and Criterion-n 504C.

Figure 6:
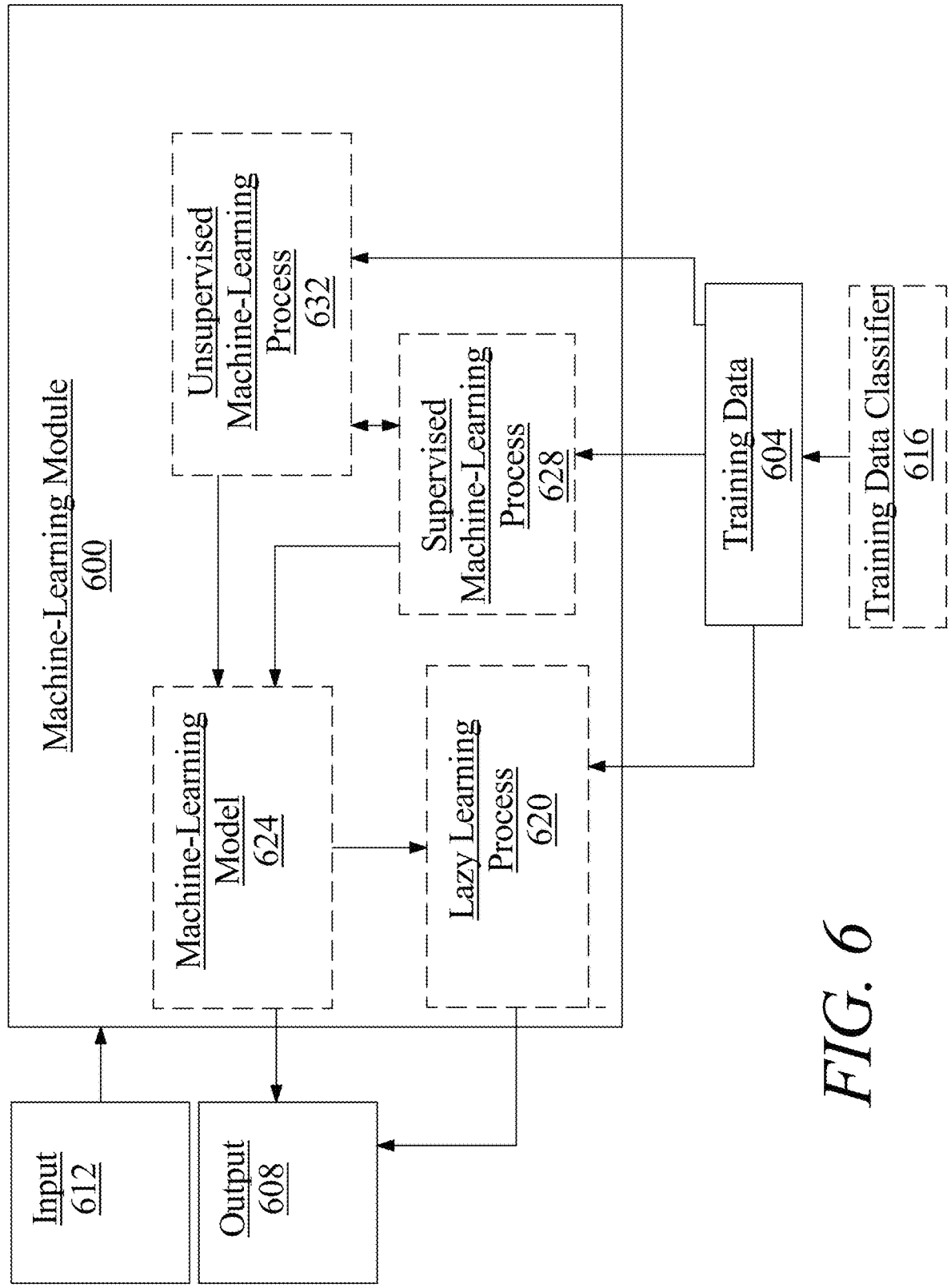
FIG. 6 is a block diagram illustrating an exemplary embodiment of a machine-learning module.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used in this disclosure, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example input data may include previous candidate intervention representations and output data may include deterministic outcomes related to those previous candidate intervention representations.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined in this disclosure, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include previous candidate intervention representations as described above as inputs, deterministic outcomes as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used in this disclosure, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Returning to FIG. 1, as described above, in some embodiments, candidate intervention representation 112 may be communicated to and/or from computing device 104 in an obfuscated form (e.g., encrypted), such that substantially only the computing device 104 may reliably access the candidate intervention representation 112. In some cases, computing device 104 may perform storage by way of an immutable sequential listing.

An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

Figure 7:
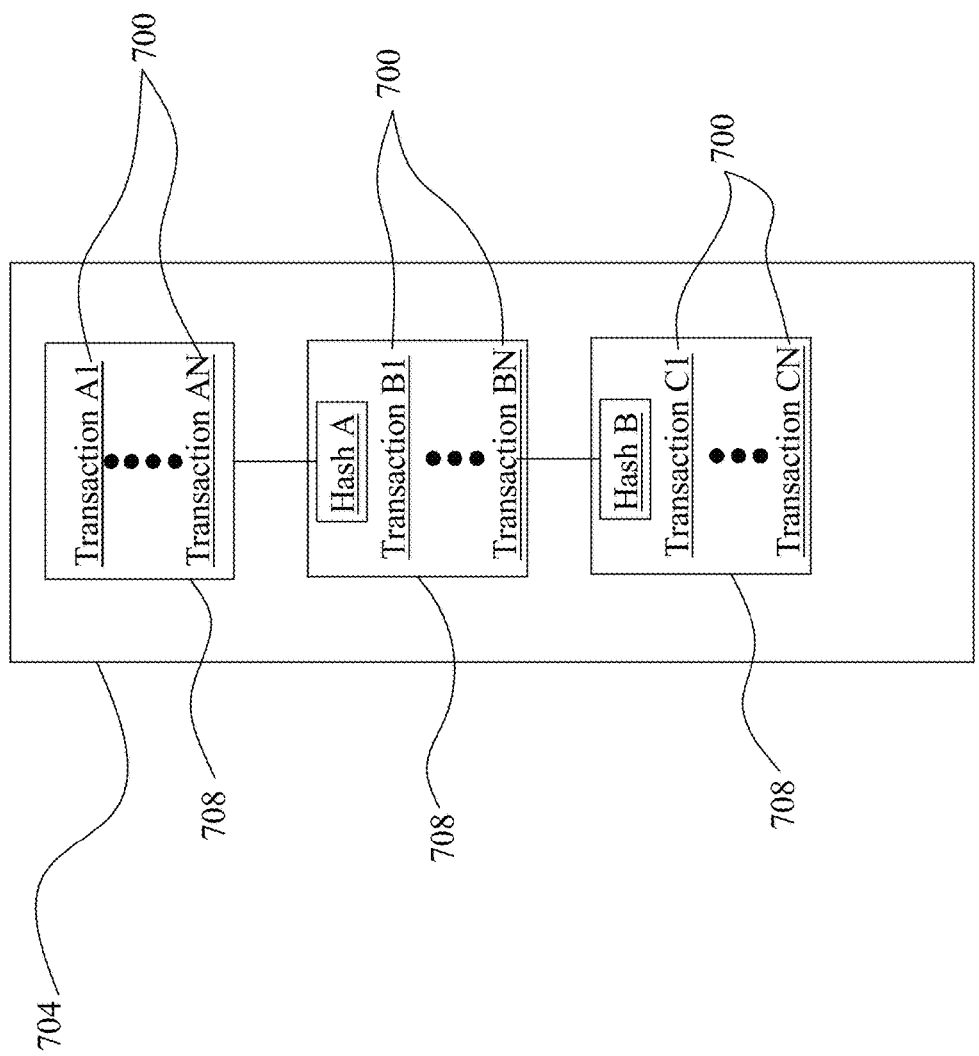
FIG. 7 is a block diagram illustrating an exemplary embodiment of an immutable sequential listing.

Referring now to FIG. 7, an exemplary embodiment of an immutable sequential listing 700 is illustrated. Data elements are listing in immutable sequential listing 700; data elements may include any form of data, including textual data, image data, encrypted data, cryptographically hashed data, and the like. Data elements may include, without limitation, one or more at least a digitally signed assertions. In one embodiment, a digitally signed assertion 704 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 204. In an embodiment, collection of textual data states that the owner of a certain transferable item represented in a digitally signed assertion 204 register is transferring that item to the owner of an address. A digitally signed assertion 204 may be signed by a digital signature created using the private key associated with the owner's public key, as described above.

Still referring to FIG. 7, a digitally signed assertion 704 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 704 may describe the transfer of a physical good; for instance, a digitally signed assertion 704 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 204 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 7, in one embodiment, an address is a textual datum identifying the recipient of virtual currency or another item of value in a digitally signed assertion 704. In some embodiments, address is linked to a public key, the corresponding private key of which is owned by the recipient of a digitally signed assertion 704. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 704 may record a subsequent a digitally signed assertion 704 transferring some or all of the value transferred in the first a digitally signed assertion 704 to a new address in the same manner. A digitally signed assertion 704 may contain textual information that is not a transfer of some item of value in addition to, or as an alternative to, such a transfer. For instance, as described in further detail below, a digitally signed assertion 704 may indicate a confidence level associated with a distributed storage node as described in further detail below.

In an embodiment, and still referring to FIG. 7 immutable sequential listing 700 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described in this disclosure, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 700 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 7, immutable sequential listing 700 may preserve the order in which the at least a posted content took place by listing them in chronological order; alternatively or additionally, immutable sequential listing 700 may organize digitally signed assertions 704 into sub-listings 708 such as "blocks" in a blockchain, which may be themselves collected in a temporally sequential order; digitally signed assertions 704 within a sub-listing 708 may or may not be temporally sequential. The ledger may preserve the order in which at least a posted content took place by listing them in sub-listings 708 and placing the sub-listings 708 in chronological order. The immutable sequential listing 700 may be a distributed, consensus-based ledger, such as those operated according to the protocols promulgated by Ripple Labs, Inc., of San Francisco, Calif., or the Stellar Development Foundation, of San Francisco, Calif., or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 700 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 7, immutable sequential listing 700, once formed, may be inalterable by any party, no matter what access rights that party possesses. For instance, immutable sequential listing 700 may include a hash chain, in which data is added during a successive hashing process to ensure non-repudiation. Immutable sequential listing 700 may include a block chain. In one embodiment, a block chain is immutable sequential listing 700 that records one or more new at least a posted content in a data item known as a sub-listing 708 or "block." An example of a block chain is the BITCOIN block chain used to record BITCOIN transactions and values. Sub-listings 708 may be created in a way that places the sub-listings 708 in chronological order and link each sub-listing 708 to a previous sub-listing 708 in the chronological order so that any computing device may traverse the sub-listings 708 in reverse chronological order to verify any at least a posted content listed in the block chain. Each new sub-listing 708 may be required to contain a cryptographic hash describing the previous sub-listing 708. In some embodiments, the block chain contains a single first sub-listing 708 sometimes known as a "genesis block."

Still referring to FIG. 7, the creation of a new sub-listing 708 may be computationally expensive; for instance, the creation of a new sub-listing 708 may be designed by a "proof of work" protocol accepted by all participants in forming the immutable sequential listing 700 to take a powerful set of computing devices a certain period of time to produce. Where one sub-listing 708 takes less time for a given set of computing devices to produce the sub-listing 708 protocol may adjust the algorithm to produce the next sub-listing 708 so that it will require more steps; where one sub-listing 708 takes more time for a given set of computing devices to produce the sub-listing 708 protocol may adjust the algorithm to produce the next sub-listing 708 so that it will require fewer steps. As an example, protocol may require a new sub-listing 708 to contain a cryptographic hash describing its contents; the cryptographic hash may be required to satisfy a mathematical condition, achieved by having the sub-listing 708 contain a number, called a nonce, whose value is determined after the fact by the discovery of the hash that satisfies the mathematical condition. Continuing the example, the protocol may be able to adjust the mathematical condition so that the discovery of the hash describing a sub-listing 708 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 708 according to the protocol is known as "mining." The creation of a new sub-listing 708 may be designed by a "proof of stake" protocol as will be apparent to those skilled in the art upon reviewing the entirety of this disclosure.

Continuing to refer to FIG. 7, in some embodiments, protocol also creates an incentive to mine new sub-listings 708. The incentive may be financial; for instance, successfully mining a new sub-listing 708 may result in the person or entity that mines the sub-listing 708 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 708 Each sub-listing 708 created in immutable sequential listing 700 may contain a record or at least a posted content describing one or more addresses that receive an incentive, such as virtual currency, as the result of successfully mining the sub-listing 708.

With continued reference to FIG. 7, where two entities simultaneously create new sub-listings 708, immutable sequential listing 700 may develop a fork; protocol may determine which of the two alternate branches in the fork is the valid new portion of the immutable sequential listing 700 by evaluating, after a certain amount of time has passed, which branch is longer. "Length" may be measured according to the number of sub-listings 708 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 708 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 700 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 700.

Still referring to FIG. 7, additional data linked to at least a posted content may be incorporated in sub-listings 708 in the immutable sequential listing 700; for instance, data may be incorporated in one or more fields recognized by block chain protocols that permit a person or computer forming a at least a posted content to insert additional data in the immutable sequential listing 700. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 7, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 708 in a block chain computationally challenging; the incentive for producing sub-listings 708 may include the grant of new crypto-currency to the miners. Quantities of crypto-currency may be exchanged using at least a posted content as described above.

Figure 8:
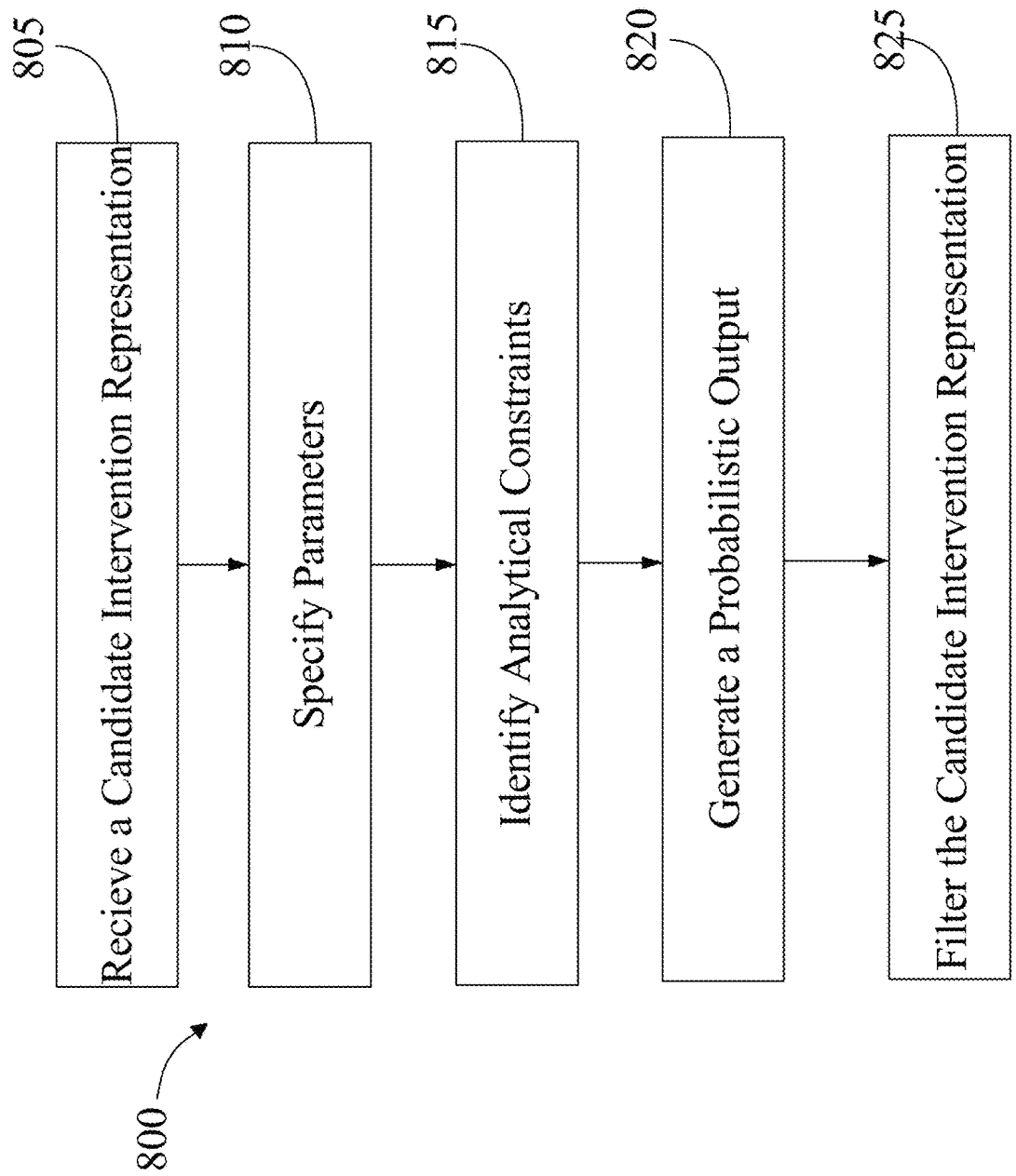
FIG. 8 is a flow diagram illustrating an exemplary embodiment of a method of probabilistically filtering candidate intervention representations.

Now referring to FIG. 8, an exemplary embodiment of a method 800 for probabilistically filtering candidate intervention representations is illustrated. At step 805, a computing device receives a candidate intervention representation 112; this may be implemented, without limitation, in any manner described above in reference to FIGS. 1-7. Computing device 104 may include any computing device 104 as described above in reference to FIGS. 1-7. Candidate intervention representation 112 may include any candidate intervention representation 112, as described above in reference to FIGS. 1-7. A candidate intervention representation 112 may be filtered into any number of predetermined classes as a result of exemplary method 700.

Still referring to FIG. 8, at step 810, computing device 104 specifies a plurality of parameters 116; this may be implemented, without limitation, in any manner described above in reference to FIGS. 1-7. A plurality of analytic parameters 116 includes any of the analytic parameters 116 as described above in reference to FIGS. 1-7. plurality of parameters 116 are specified as a function of a candidate intervention representation 112.

Still referring to FIG. 8, at step 815, computing device 104 identifies a plurality of analytical constraints 124. A plurality of analytical constraints 124 include any of the analytical constraints 124 as described above in reference to FIGS. 1-7. Each analytical constraint of a plurality of analytical constraints 124 corresponds to an analytical parameter of a plurality of parameters 116.

Still referring to FIG. 8, at step 820, computing device 104 generates a probabilistic output 132; this may be implemented, without limitation, in any manner described above in reference to FIGS. 1-7. A probabilistic output 132 includes any of the probabilistic outputs described above in reference to FIGS. 1-7. A probabilistic output 132 is a function of a candidate intervention representation 112, a plurality of analytic constraints 124, and training data correlating past intervention representations to a deterministic outcome. Training data is any of the training data described above in reference to FIGS. 1-7. Past intervention representations are any of the past intervention representations or previous candidate intervention representations described above in reference to FIGS. 1-7. A deterministic outcome is any of the deterministic outcome described above in reference to FIGS. 1-7. In some embodiments, step 820 additionally includes operating a machine-learning model; the machine-learning model may be trained using training data. Training data may include any of the training data described above in reference to FIGS. 1-7. In some embodiments, step 820 additionally includes operating a machine-learning model, wherein the machine-learning model is trained using training data and a supervised machine-learning algorithm.

Still referring to FIG. 8, at step 825, computing device 104 filters candidate intervention representation 112, using probabilistic output 132; this may be implemented, without limitation, in any manner described above in reference to FIGS. 1-7. In some embodiments, step 825 results in an output classifying a status. In additional embodiments, step 825 results in a confidence output representing a relationship between a status and a probabilistic output.

Still referring to FIG. 8, in some embodiments, method may additionally include securely storing at least a candidate intervention representation. Alternatively or additionally, in some embodiments, method 800 may additionally include training a machine-learning model using training data. In some cases, machine-learning model may be trained using a supervised machine-learning algorithm. Alternatively or additionally, in some cases, machine-learning model may be trained using an unsupervised machine-learning algorithm. In additional embodiments, method 800 may include training machine-learning model using probabilistic output correlated to a deterministic intervention representation. Probabilistic output may be any of the probabilistic output described above, in reference to FIGS. 1-7. In yet another embodiments, method 800 may additionally include interrogating a user device for plurality of analytical constraints.

Figure 9:
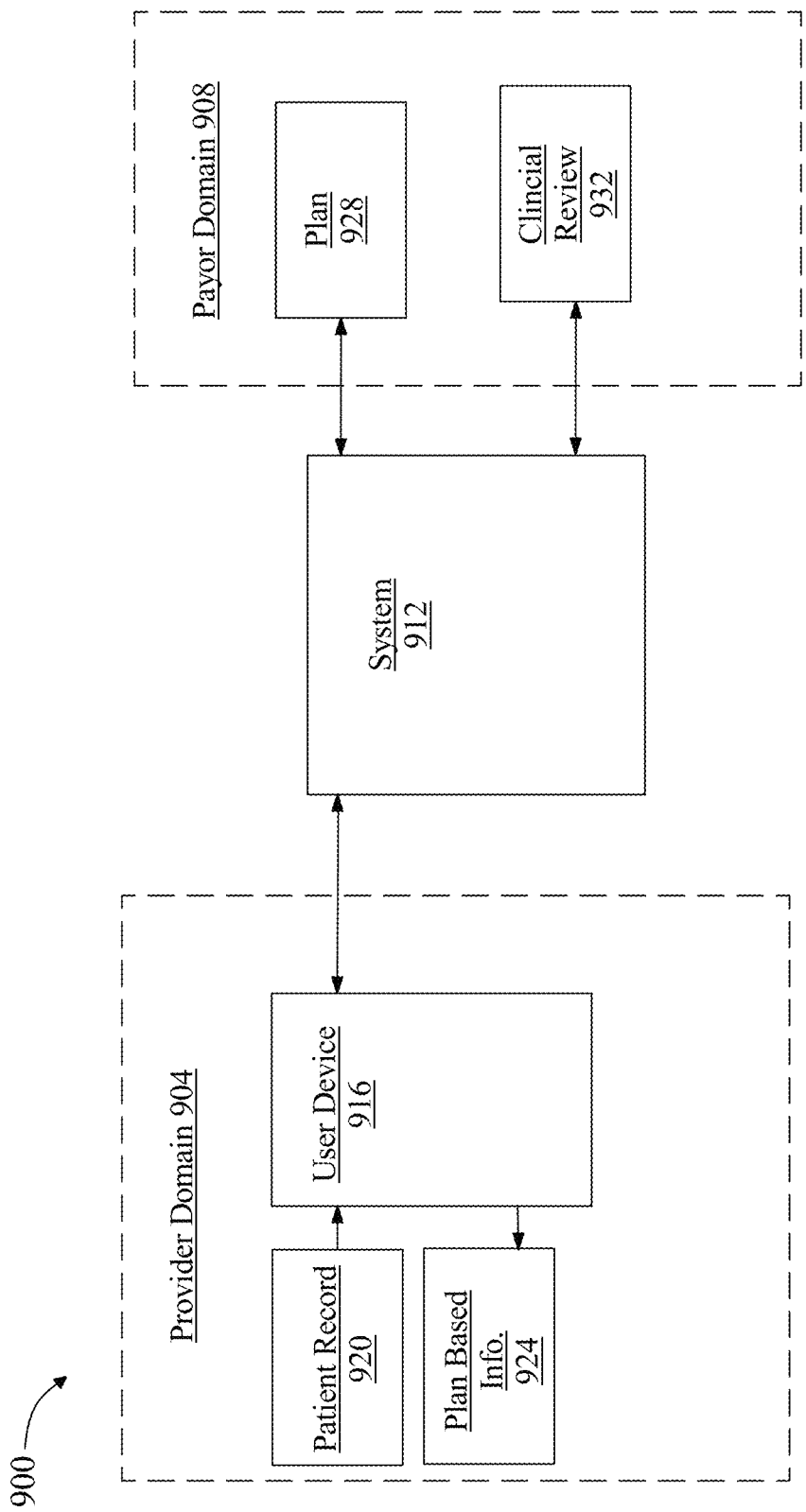
FIG. 9 is a block diagram illustrating an exemplary application according to some embodiments of the invention.

According to certain exemplary embodiments, aspects of the present invention may be used to automatically provide prior authorization recommendations, for example for medical interventions. Referring to FIG. 9, an exemplary environment 900 for automatically providing prior authorization recommendations, accord to some embodiments, is presented. Environment 900 may include a provider domain 904 and a payer domain 908. Provider domain 904 may be used by healthcare providers and consumers, for example doctors, nurses, healthcare administrators, and patients. Payer domain 10 may be used by health service payors, for example health insurers, self-insurers, and government agencies; the payer domain 908 may also be used by groups responsible for maintaining formularies, for example a pharmacy benefits manager (PBM). A prior authorization recommendation system 912 may be communicative with both provider domain 904 and payor domain 908. In some embodiments, system 912 may be local to one or both of provider domain 904 and payor domain 908. Alternatively or additionally, system 912 may be remote to one or both of provider domain 904 and/or payor domain 908 and communicative with the provider domain 904 and/or the payor domain 908 by way of one or more networks. System 912 may be communicative with a user device 916, with provider domain 904. In some embodiments, user device 916 may include an electronic health record (EHR). In some cases, a patient record 920 may be input into user device 916. In some cases, patient record 920 may include a prior authorization request, information about a patient, and/or information about the patient's health insurance plan, for example a health plan identifier. A prior authorization request may include a candidate intervention identifier, as described above. Information about a patient may include at least a portion of a plurality of analytical constraints and/or at least a portion of at least a criteria, as described above. According to certain exemplary embodiments, a criterion may include one or more of an intervention class, such as without limitation a medication class, a diagnosis, or a medical requirement. According to certain exemplary embodiments, an analytical constraint may include one or more of a specific intervention, such as without limitation a specific medication, a medical condition, or a diagnostic attribute. In certain exemplary embodiments, information about a patient communicated with patient record 920 may not include patient identification. In some cases, not including identifying patient information may reduce regulatory burdens upon system 912 and may not needed for the system's function. In some cases, patient record 920 may include unstructured data, which system 912 may process, for example by using machine-learning methods described in this disclosure, to identify and codify useful patient information, such as without limitation analytical constraints, as described above. User device may also communicate plan-based information 924 to within provider environment 904. Plan-based information 924, in some embodiments without limitation, may include a prior authorization recommendation, which may have been generated by system 912. A prior authorization recommendation may represent either or both of a filtered candidate intervention identifier and/or an output classifying a status, as described above. A prior authorization recommendation, in some cases, may include a classification of either accepted or denied, as determined by system 912. In some additional embodiments, prior authorization recommendation may include information justification of chosen classification.

Continuing with reference to FIG. 9, a system 912 may also be communicative with plan information 928 within payor environment 908. Plan information 928 may include or be used in ascertaining one or more of criteria, analytical parameters, and/or analytical constraints, as described above. Plan information 928 may include at least a formulary, lists of approved medical interventions, and features directly relevant to coverage of potential interventions. Additionally or alternatively, a clinical reviewer 932, within payor environment 908, may also be communicative with system 912. Clinical reviewer 932, in some embodiments, may receive a prior authorization recommendation from system 912. Clinical reviewer 932, in some cases, may choose to accept or deny a prior authorization based in part upon prior authorization recommendation from system 912. After clinical reviewer's decision regarding prior authorization, system may be retrained using training data that includes clinical reviewer's decision and corresponding prior authorization request. In some cases, retraining of system 912 is performed periodically, such as without limitation every month, every three, months or every year, in order to ensure that prior authorization recommendations are continually in-line with current clinical reviewer's decisions.

With reference to FIG. 9, system 912 may generate a prior authorization recommendation after receiving prior authorization request 920 from user device 916. In some cases, system 912, may interrogate user device 916 for additional information (e.g., analytical constraints), for example by way of one or more form submissions. Alternatively or additionally, system 912 may identify analytical constraints from one or more of plan information 928 or clinical reviewer 932.

Figure 10:
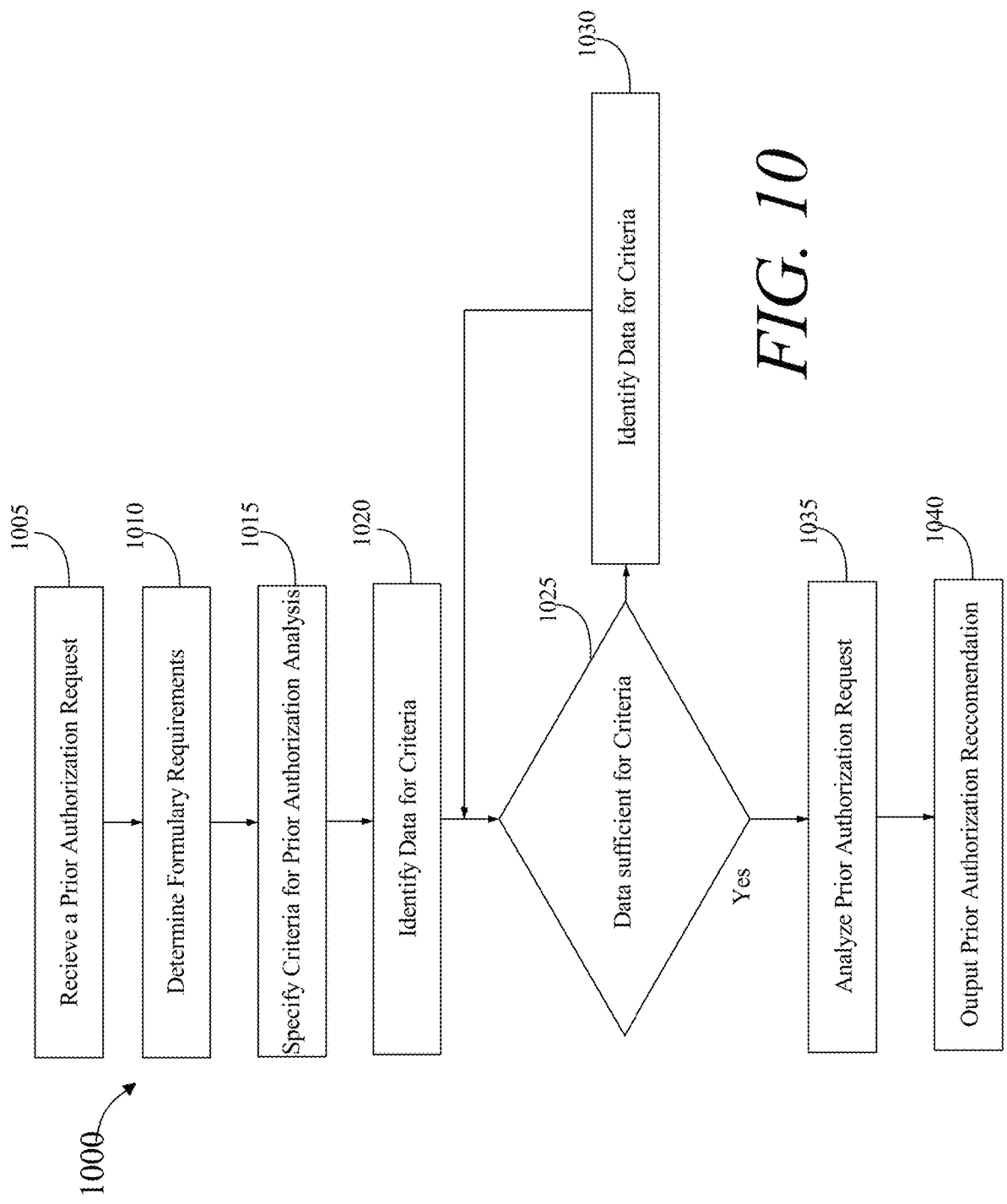
FIG. 10 is a flow diagram illustrating an exemplary application according to some embodiments of the invention; and, FIG. 11 a block diagram of a computing system that can be used to implement any one or more of the methodologies disclosed in this disclosure and any one or more portions thereof.

System 912 may generate a prior authorization recommendation by performing a certain exemplary method. Referring now to FIG. 10, an exemplary embodiment of a method 1000 is illustrated. At step 1005, system 912 receives a prior authorization request, for example from a user device. In some cases, prior authorization request may include information about a patient's medical insurance plan. At step 1010, prior authorization may be used to determine formulary requirements affecting a patient; for example, information about the patient's medical insurance plan in some cases is used to determine formulary requirements, at step 1010. Formulary requirements may include at least a criterion related to payor coverage (e.g., authorization) of an intervention. As used in this disclosure "formulary" refers to an enumeration of interventions (e.g., medical tests, medications, surgeries, etc.) that may be classified according to tier. At step 1015, system 912 specifies at least a criterion associated with prior authorization request. At least a criterion may include any criteria or criterion described above. In some embodiments, at least a criterion may be used to determine a plurality of analytical constraints, sometimes called features. Determination of an association between at least a criterion and analytical constraints may be determined manually or by way of any of machine-learning method described in this disclosure. In some exemplary cases, a mapping of at least a criterion to analytical constraints may be performed using training data, such as previous prior authorization requests, which may be correlated to deterministic outcomes such as actual payor determinations for the previous prior authorization requests. At step 1020, system 912 may identify available data related to at least a criterion. Identified data, in some cases, may be identified from prior authorization request and/or plan information. In some embodiments, system 912 may attempt to satisfy specified at least a criterion by using available data. In some cases, available data may include a plurality of analytical constraints. Analytical constraints may include any analytical constraints, as described above. At step 1025, system 912 may decide if available data is sufficient to satisfy specified at least a criterion. In some cases, step 1025 may include ensuring that an analytical constraint corresponds to each analytical parameter of a plurality of parameters. If it is determined that available data is not sufficient to satisfy at least a criterion, step 1030 may be performed by system 912. Step 1030 may include interrogating for additional data related to at least a criterion. In some cases, additional data may include one or more analytical constraints. In some embodiments, as additional data is submitted, additional data may be made available to system 912, thereby becoming available data. Step 1025 may be repeated until available data is sufficient to satisfy at least a criterion. At step 1035, system 912 analyzes prior authorization request using at least a criterion and available data. In some cases, step 1035 may include generating a probabilistic output, as described above, and/or filtering a candidate intervention representation, as described above. Finally, at step 1040, as a result of step 35, a prior authorization recommendation is output. In some cases, prior authorization recommendation may include a confidence output. Confidence output may include a probability related to system's confidence of prior authorization recommendation. Confidence output may include any confidence output, described above.

Continuing with reference to FIG. 10, in some cases, prior authorization may include a denial of prior authorization. In cases of denial of prior authorization, method 1000 may additionally include a step for suggesting alternative intervention. For example, in some cases a denial may of a higher tier intervention may include a recommendation, with approval, for a lower tier intervention, such as without limitation a step therapy.

It is to be noted that any one or more of the aspects and embodiments described in this disclosure may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described in this disclosure. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used in this disclosure, is intended to include a single medium as well as a collection of physically separate media, such as, for example, a collection of compact discs or one or more hard disk drives in combination with a computer memory. As used in this disclosure, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described in this disclosure.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 11:
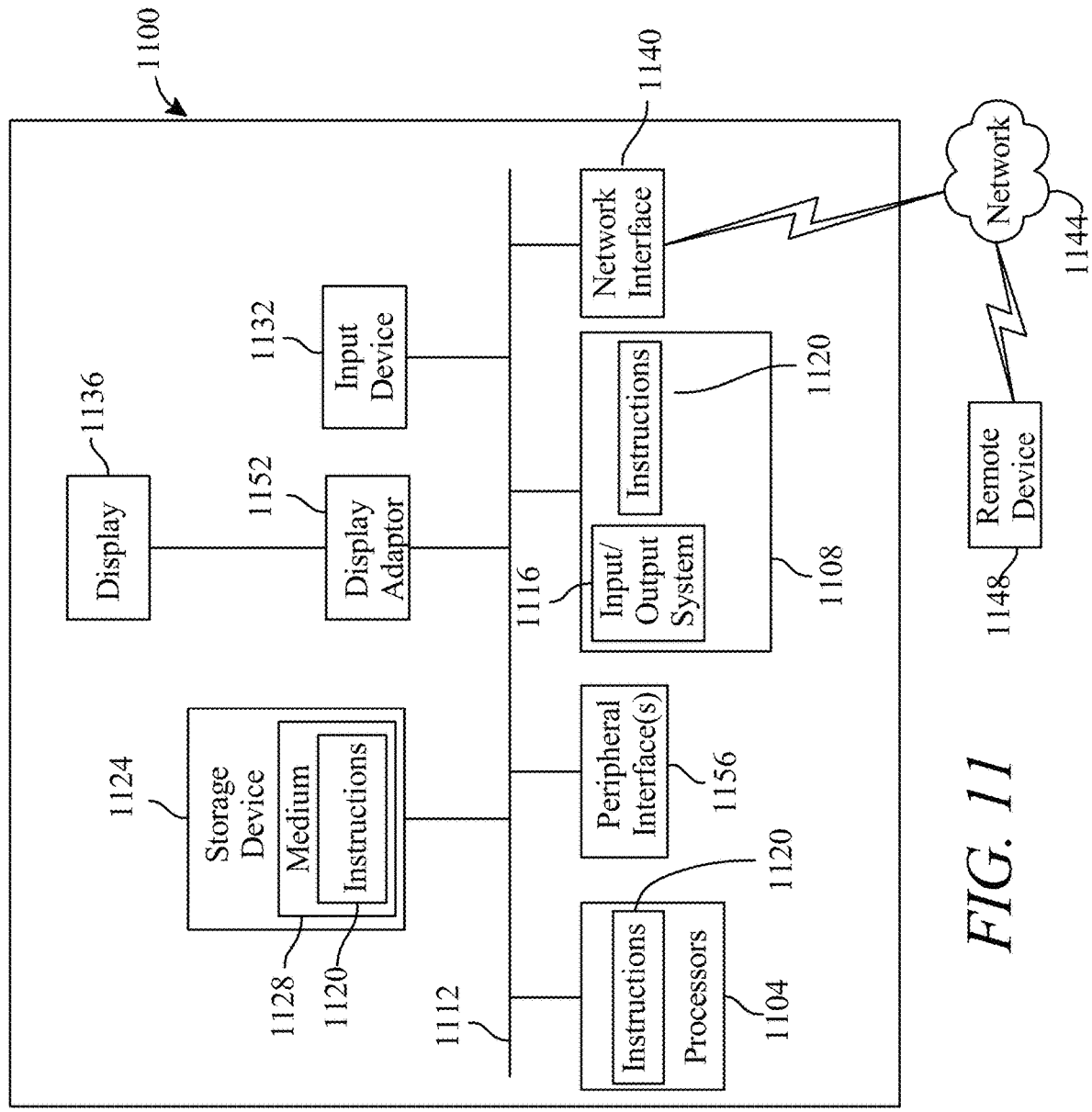

FIG. 11 shows a diagrammatic representation of one embodiment of a computing device in the exemplary form of a computer system 1100 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1100 includes a processor 1104 and a memory 1108 that communicate with each other, and with other components, via a bus 1112. Bus 1112 may include any of several types of bus structures including, but not limited to, a memory bus, a memory controller, a peripheral bus, a local bus, and any combinations thereof, using any of a variety of bus architectures.

Processor 1104 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1104 may be organized according to Von Neumann and/or Harvard architecture as a non-limiting example. Processor 1104 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1108 may include various components (e.g., machine-readable media) including, but not limited to, a random-access memory component, a read only component, and any combinations thereof. In one example, a basic input/output system 1116 (BIOS), including basic routines that help to transfer information between elements within computer system 1100, such as during start-up, may be stored in memory 1108. Memory 1108 may also include (e.g., stored on one or more machine-readable media) instructions (e.g., software) 1120 embodying any one or more of the aspects and/or methodologies of the present disclosure. In another example, memory 1108 may further include any number of program modules including, but not limited to, an operating system, one or more application programs, other program modules, program data, and any combinations thereof.

Computer system 1100 may also include a storage device 1124. Examples of a storage device (e.g., storage device 1124) include, but are not limited to, a hard disk drive, a magnetic disk drive, an optical disc drive in combination with an optical medium, a solid-state memory device, and any combinations thereof. Storage device 1124 may be connected to bus 1112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1124 (or one or more components thereof) may be removably interfaced with computer system 1100 (e.g., via an external port connector (not shown)). Particularly, storage device 1124 and an associated machine-readable medium 1128 may provide nonvolatile and/or volatile storage of machine-readable instructions, data structures, program modules, and/or other data for computer system 1100. In one example, software 820 may reside, completely or partially, within machine-readable medium 1128. In another example, software 1120 may reside, completely or partially, within processor 1104.

Computer system 1100 may also include an input device 1132. In one example, a user of computer system 1100 may enter commands and/or other information into computer system 1100 via input device 1132. Examples of an input device 1132 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1132 may be interfaced to bus 1112 via any of a variety of interfaces (not shown) including, but not limited to, a serial interface, a parallel interface, a game port, a USB interface, a FIREWIRE interface, a direct interface to bus 1112, and any combinations thereof. Input device 1132 may include a touch screen interface that may be a part of or separate from display 1136, discussed further below. Input device 1132 may be utilized as a user selection device for selecting one or more graphical representations in a graphical interface as described above.

A user may also input commands and/or other information to computer system 1100 via storage device 1124 (e.g., a removable disk drive, a flash drive, etc.) and/or network interface device 1140. A network interface device, such as network interface device 1140, may be utilized for connecting computer system 1100 to one or more of a variety of networks, such as network 1144, and one or more remote devices 1148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1144, may employ a wired and/or a wireless mode of communication. In general, any network topology may be used. Information (e.g., data, software 1120, etc.) may be communicated to and/or from computer system 1100 via network interface device 1140.

Computer system 1100 may further include a video display adapter 1152 for communicating a displayable image to a display device, such as display device 1136. Examples of a display device include, but are not limited to, a liquid crystal display (LCD), a cathode ray tube (CRT), a plasma display, a light emitting diode (LED) display, and any combinations thereof. Display adapter 1152 and display device 1136 may be utilized in combination with processor 1104 to provide graphical representations of aspects of the present disclosure. In addition to a display device, computer system 1100 may include one or more other peripheral output devices including, but not limited to, an audio speaker, a printer, and any combinations thereof. Such peripheral output devices may be connected to bus 1112 via a peripheral interface 1156. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described in this disclosure is merely illustrative of the application of the principles of the present invention. Additionally, although particular methods in this disclosure may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed in this disclosure without departing from the spirit and scope of the present invention.

What is claimed is:

1. A method of probabilistically filtering candidate intervention representations, using machine-learning, the method comprising:
   receiving, using a processor, at least a candidate intervention representation, wherein the candidate intervention representation is a prior authorization request for a medical intervention;
   specifying, using the processor, a plurality of parameters as a function of the at least a candidate intervention representation;
   identifying, using the processor, a plurality of analytical constraints, wherein each analytical constraint corresponds to an analytical parameter of the plurality of parameters, wherein identifying the plurality of analytical constraints comprises identifying at least an analytical constraint of the plurality of analytical constraints from plan information;
   generating, using the processor, a probabilistic output as a function of the at least a candidate intervention representation, the plurality of analytic constraints, and training data correlating intervention representations to deterministic outcomes; and,
   filtering, using the processor, the at least a candidate intervention representation using the probabilistic output, wherein filtering the at least a candidate intervention representation results in a confidence output;
   generating, using the processor, a prior authorization recommendation as a function of a filtered candidate intervention representation.

2. The method of claim 1, wherein filtering the at least a candidate intervention comprises using a fuzzy set comparison that calculates using the processor, an overlap between a first fuzzy set, represented by a first membership function, and a second fuzzy set, represented by a second membership function.

3. The method of claim 1, wherein generating the probabilistic output comprises using a machine learning model, wherein the machine learning model is trained using the training data and a neural network.

4. The method of claim 3, further comprising training the machine learning model using the training data.

5. The method of claim 3, wherein the machine learning model is trained using an unsupervised machine learning algorithm.

6. The method of claim 3, wherein the machine learning model is trained using a supervised machine learning algorithm.

7. The method of claim 3, further comprising training the machine learning model using the probabilistic output correlated to a deterministic intervention representation.

8. The method of claim 1, further comprising interrogating, using the processor, a user device for the plurality of analytical constraints.

9. The method of claim 1, wherein filtering the at least a candidate intervention representation results in an output classifying a status.

10. The method of claim 9, further comprising suggesting an alternative intervention as a function of the status of the output.

11. A system for probabilistically filtering candidate intervention representations, using machine learning, the system comprising a processor configured to:
receive at least a candidate intervention representation, wherein the candidate intervention representation is a prior authorization request for a medical intervention;
specify a plurality of parameters as a function of the at least a candidate intervention representation;
identify a plurality of analytical constraints, wherein each analytical constraint corresponds to an analytical parameter of the plurality of parameters, wherein identifying the plurality of analytical constraints comprises identifying at least an analytical constraint of the plurality of analytical constraints from plan information;
generate a probabilistic output as a function of the at least a candidate intervention representation, the plurality of analytic constraints, and training data correlating intervention representations to a deterministic outcome; and,
filter, using the processor, the at least a candidate intervention representation using the probabilistic output, wherein filtering the at least a candidate intervention representation results in a confidence output;
generate a prior authorization recommendation as a function of a filtered candidate intervention representation.

12. The system of claim 11, wherein the processor is further configured to filter the at least a candidate intervention by using a fuzzy set comparison that calculates an overlap between a first fuzzy set, represented by a first membership function, and a second fuzzy set, represented by a second membership function.

13. The system of claim 11, wherein the processor is further configured to generate the probabilistic output using a machine learning model, wherein the machine learning model comprises a neural network that is trained using the training data.

14. The system of claim 13, wherein the processor is further configured to implement a training of the neural network of the machine learning model using the training data.

15. The system of claim 13, wherein the processor is further configured to implement a training of the neural network of the machine learning model using the training data using an unsupervised machine learning algorithm.

16. The system of claim 13, wherein the processor is further configured to implement a training of the neural network of the machine learning model using the training data using a supervised machine learning algorithm.

17. The system of claim 13, wherein the processor is further configured to implement a training of the neural network of the machine learning model using the probabilistic output correlated to a deterministic intervention representation.

18. The system of claim 13, wherein the processor is further configured to interrogate a user device for the plurality of analytical constraints.

19. The system of claim 11, wherein the processor is further configured to filter the at least a candidate intervention representation to result in an output classifying a status.

20. The system of claim 19, wherein the processor is further configured to suggest an alternative intervention as a function of the status of the output.

* * * * *